C. Tabor,
Milk Pail.
No. 107,834. Patented Sep. 27, 1870.
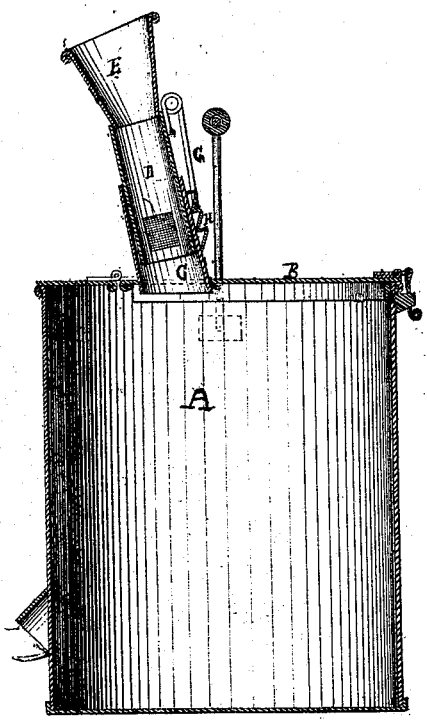
Witnesses
Jno. A. Ellis
J. V. White
Inventor
Chuck Taber
Per
T. H. Alexander
Atty

UNITED STATES PATENT OFFICE.

CHURCH TABOR, OF CRAFTSBURY, VERMONT.

IMPROVEMENT IN MILK-PAILS.

Specification forming part of Letters Patent No. 107,834, dated September 27, 1870.

*To all whom it may concern:*

Be it known that I, CHURCH TABOR, of Craftsbury, in the county of Orleans and State of Vermont, have invented certain new and useful Improvements in Milk-Pails; and I do hereby declare that the following is a full, clear, and exact description thereof, reference being had to the accompanying drawings, and to the letters of reference marked thereon, which form a part of this specification.

The nature of my invention consists in the construction of a milk-pail with strainer attachment, which will be hereinafter fully set forth.

In order to enable others skilled in the art to which my invention appertains to make and use the same, I will now proceed to describe its construction and operation, referring to the annexed drawing, in which—

A represents a milk-pail, of any suitable shape and dimensions, provided with a hinged lid, B, in which is formed an inverted funnel, C, projecting upward, as shown in the drawings.

In the inverted funnel C is inserted a tube or cylinder, D, which is closed at its lower end, and at its upper end provided with a funnel, E. In the sides of the tube or cylinder D, a suitable distance above its lower end, are one or more openings, covered with fine wire-gauze or other suitable straining material.

The funnel E and tube D may together be called a "funnel," although I have mentioned them separately.

On one side, at or near the top of the tube D, is secured a spring, G, formed of one piece of wire, the ends of which are coiled and soldered to the tube, while the center forms a square-cornered loop, which extends downward, as seen in the drawings.

On the side of the inverted funnel C is attached a ratchet-bar, H, upon either one of the teeth of which the spring G may be allowed to rest, so as to hold the funnel D E at any height desired. The spring pressing inward, the funnel is held with the necessary degree of firmness.

I am aware that there are funnels with strainers attached at their lower ends; but these have the disadvantage that when the milk comes down with any force it is apt to force the dirt through the strainer. This is entirely obviated by placing the strainer or strainers in the sides of the funnel-tube, and closing its lower end.

Having thus fully described my invention, what I claim as new, and desire to secure by Letters Patent, is—

1. A funnel having the lower end of its tube closed, and the sides of the tube provided with one or more strainers, substantially as and for the purposes herein set forth.

2. The combination of the spring G and ratchet-bar H, when constructed and used on a milk-pail, substantially in the manner and for the purposes herein set forth.

3. The combination of the pail A, lid B, inverted funnel C, with ratchet-bar H, funnel E, tube D, having its lower end closed, and its sides provided with one or more strainers, and the spring G, all substantially as and for the purposes herein set forth.

In testimony that I claim the foregoing as my own I affix my signature in presence of two witnesses.

CHURCH TABOR.

Witnesses:
T. H. ALEXANDER,
C. ALEXANDER.